Figure 1:
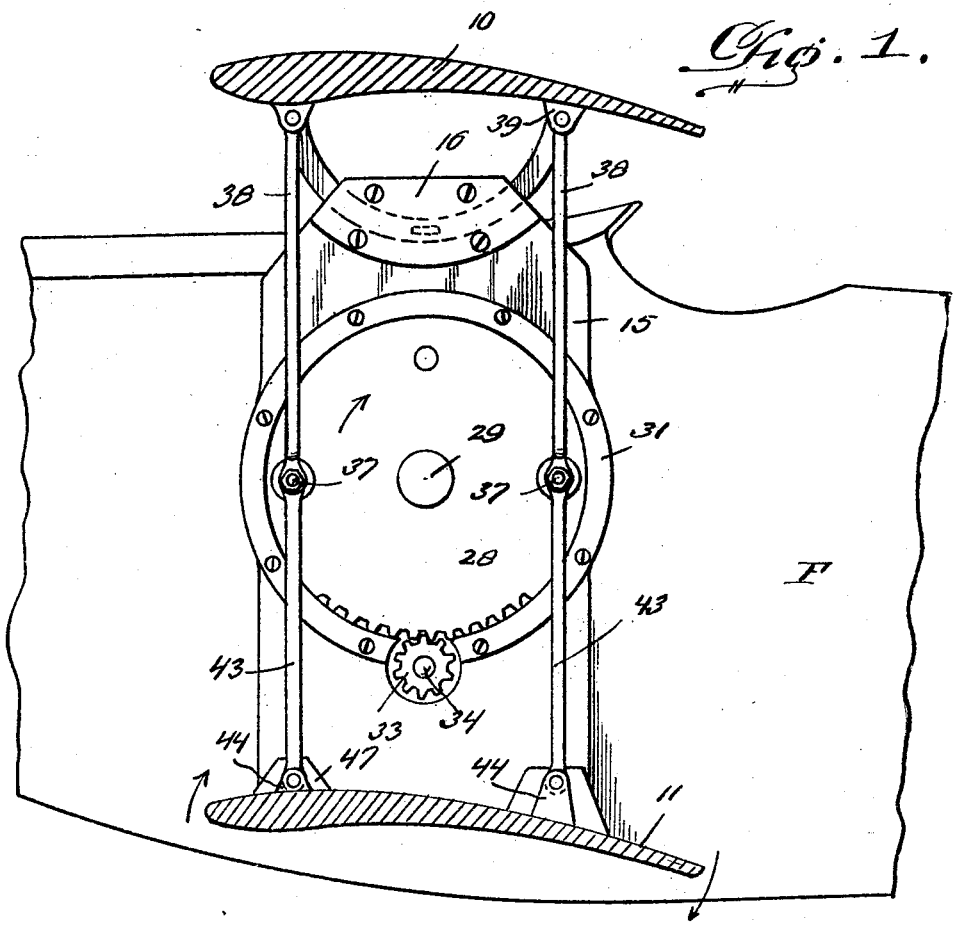

March 31, 1931.  G. W. GARDNER  1,798,665
AEROPLANE
Filed March 13, 1928   4 Sheets-Sheet 1

Inventor
G. W. Gardner,
By Clarence A. O'Brien
Attorney

March 31, 1931.  G. W. GARDNER  1,798,665
AEROPLANE
Filed March 13, 1928    4 Sheets-Sheet 2

Inventor
G. W. Gardner,
By Clarence A. O'Brien
Attorney

March 31, 1931.  G. W. GARDNER  1,798,665
AEROPLANE
Filed March 13, 1928  4 Sheets-Sheet 3

Inventor
G. W. Gardner,

By Clarence A. O'Brien
Attorney

March 31, 1931.  G. W. GARDNER  1,798,665
AEROPLANE
Filed March 13, 1928   4 Sheets—Sheet 4
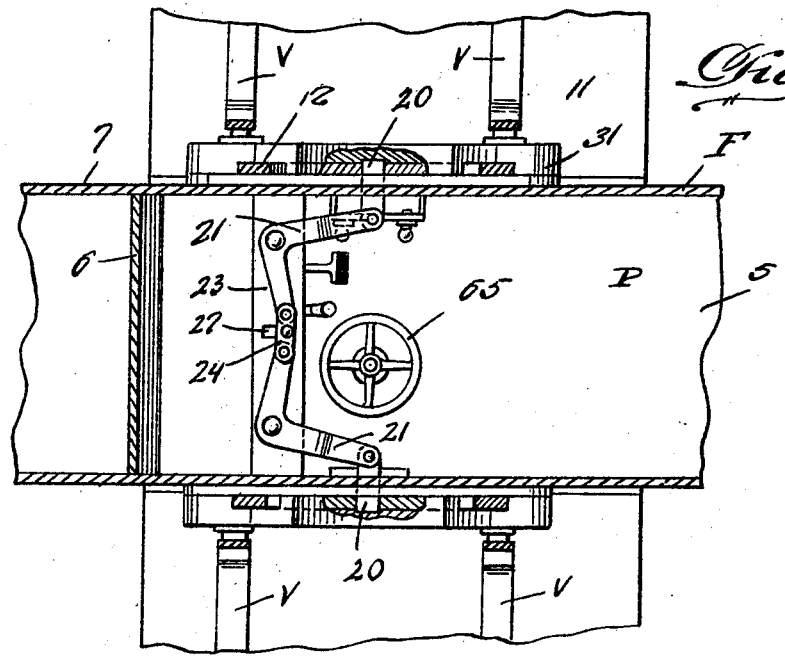
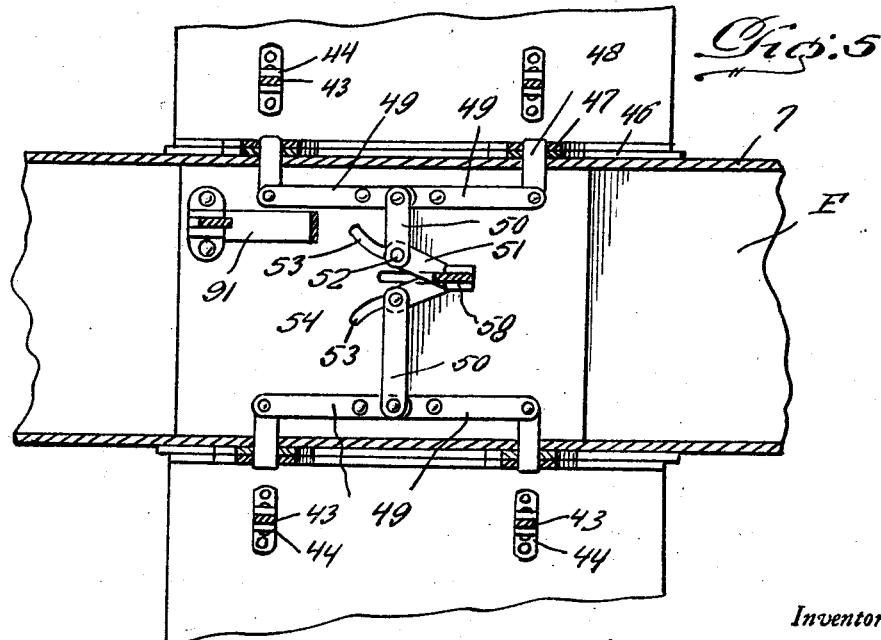
Inventor
G. W. Gardner;
By Clarence A. O'Brien
Attorney

UNITED STATES PATENT OFFICE

GEORGE W. GARDNER, OF FLINT, MICHIGAN

AEROPLANE

Application filed March 13, 1928. Serial No. 261,195.

The present invention relates generally to aeroplanes and has for its prime object to provide means for tilting the wings of the aeroplane to change the angles of incident so as to enable the aeroplane to come out of a nose dive or tail spin in an efficient and reliable manner.

Another very important object of the invention resides in the provision of an aeroplane with tiltable wings operable from the interior of the cock pit of the aeroplane and further means for releasably locking the wings rigidly in their normal position.

Another very important feature of the invention resides in the provision of a brake structure which may be applied when the locking means is released so as to prevent any unruly tilting of the wings caused by air current or the like so that the controlling apparatus is capable of proper manipulation by the aviator under all circumstances.

A still further very important object of the invention resides in the provision of a wing tilting apparatus of this nature utilizing in combination therewith automatic means to cause the lighting up of the cock pit and further providing visible signal means to indicate in which direction the wings have been tilted thereby preventing the aviator from becoming confused when coming out of either a nose dive or tail spin and enabling him to right the wings to their normal position with accuracy and assurance.

A still further very important object of the invention resides in the provision of an operating mechanism for tilting the wings which is simple in its construction, easy to install, comparatively inexpensive, strong and durable, thoroughly efficient and reliable in operation, not likely to easily become out of order, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 6:
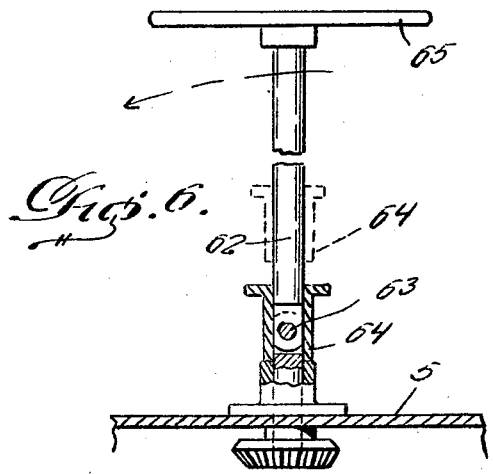
Figure 7:
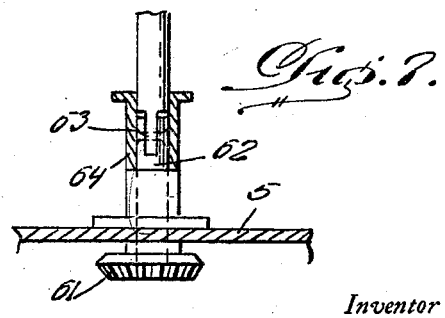
Figure 2:
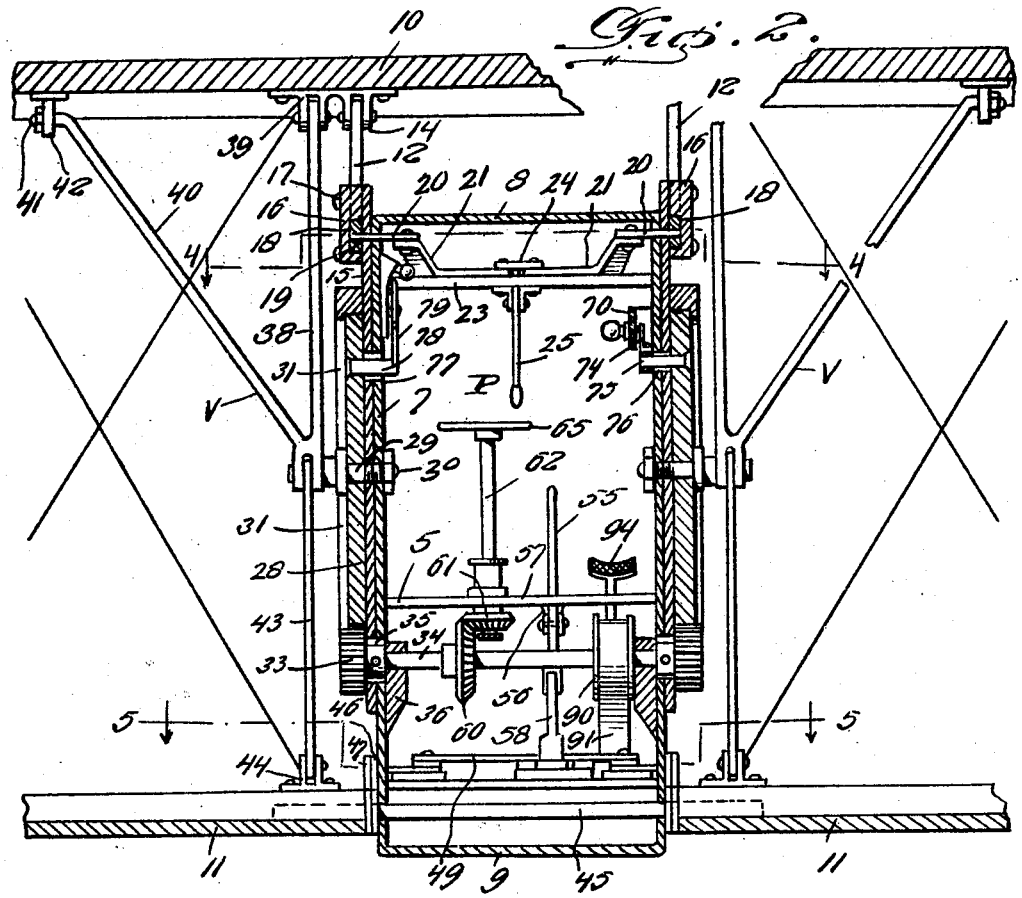
Figure 9:
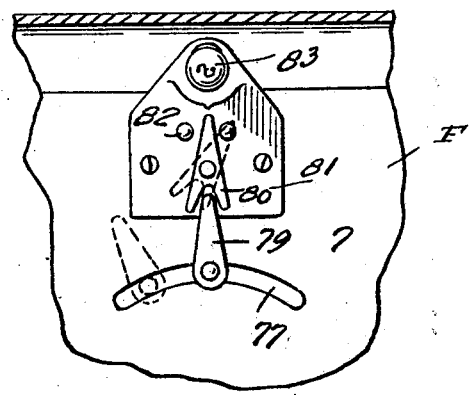
Figure 3:
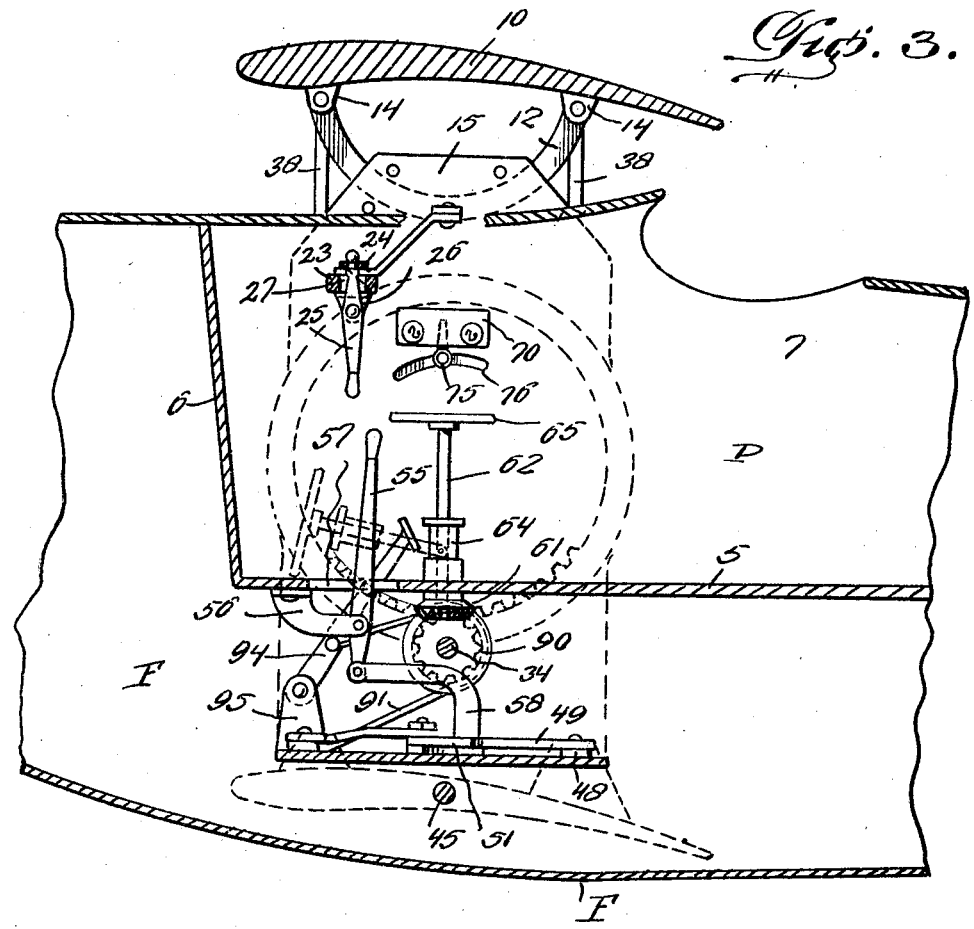
Figure 8:
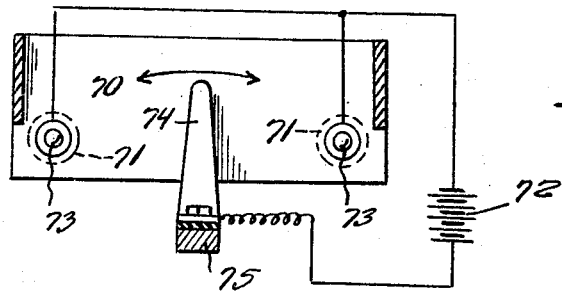

In the drawing:

Figure 1 is a fragmentary side elevation of an aeroplane fuselage showing the wings in vertical longitudinal section, Figure 2 is a transverse vertical section taken through the fuselage and wings, Figure 3 is a fragmentary vertical longitudinal section through the central portion of the fuselage and wing structure, Figure 4 is a horizontal section taken substantially on the line 4—4 of Figure 2 looking downwardly, Figure 5 is another horizontal section taken substantially on the line 5—5 of Figure 2 looking downwardly, Figure 6 is a sectional elevation of the control shaft, Figure 7 is another detail view thereof taken at right angles to that shown in Figure 6, Figure 8 is a detail sectional view showing the signal circuit closer, and Figure 9 is a detail sectional view showing the light circuit closer.

Referring to the drawing in detail it will be seen that the letter F denotes a fuselage which may be of conventional construction and is formed with a cock pit P having a bottom 5 and a front wall 6. The side walls of the fuselage F are denoted by numerals 7, the top wall by the numeral 8 and the bottom wall by the numeral 9. The top wing structure is denoted by the numeral 10 and the bottom wing sections by numerals 11. A pair of arcuate bars 12 have their ends secured to the under surface of the top wing structure 10 by brackets 14. Vertical plates 15 are secured to the side walls 7 of the fuselage to the outside thereof and have bearings 16 secured to their upper ends as at 17 and provided with arcuate grooves 18 to slidably receive the arcuate bars 12.

The intermediate portions of these arcuate bars 12 are constructed with openings 19 for receiving the extremities of bolts 20 slidably through openings in the plates 15 and side walls 7. Bell cranks 21 are rockable on the horizontal transverse support 23 in the fuselage and the upper portion of the cock pit and are connected together by the link 24. A lever 25 is rockable intermediate its ends in bracket structure 26 depending from the center of the supporting member 23 and extends through a slot 27 provided therein and is engaged with the link 24.

Obviously, therefore, by rocking the lever 25 in one direction the bolts 20 may be disengaged from the bars 12 and then by rocking the lever in the other direction the bolts may be engaged with said bars 12.

Gears 28 are rotatable on shaft 29 secured in the plate 15 and walls 7 as is clearly indicated in Figure 2 by means of nuts 30 or in any other preferred manner. Circular guards 31 are disposed on the plates 15 about the periphery of the gears 28, the lower portions of these guards 31 are open as is indicated to advantage in Figure 1 and pinions 33 mesh with the gears 28 through the open portion of the guards 31. These pinions are fixed to a shaft 34 journaled through openings 35 in the plates 15 and walls 7 and in bearings 36 secured to the inside of the walls 7.

Two pairs of V-shaped members V are associated with the gears 28, one pair with each gear. The V-shaped members of each pair have their apexes pivotally engaged as at 37 with diametrically opposed portions of one gear 28. The V-shaped member comprises an arm 38 disposed to operate in a vertical plane and having its extremity pivotally engaged with a bracket 39 secured to the wing 10 while the other arm 40 has an offset outwardly disposed end 41 rockable in an eye member 42. One V-shaped member of each pair is secured to the wing structure 10 adjacent the forward edge thereof and the other adjacent the rear edge thereof so that when the wing structure 10 is at the normal angle of incidence, the V-shaped members are disposed in vertical planes.

Links 43 are engaged as at 37 and extend down to engage with brackets 44 on the wing section 11. There are two of these links associated with each gear one being attached adjacent the forward edge of the lower wing section and the other adjacent the rear edge thereof as is indicated in Figure 1.

The wing sections 11 are connected by a shaft 45 journaled through the lower portion of the fuselage and through plates 46 fixed to the outside of the side wall 7 and through plates 47 fixed to the inner ends of the wing sections 11 to move with the wing sections while the plates 46 remain stationary.

The plates 46 and 47 have openings through which extend bolts 48 which also extend through openings in the side walls 7. These bolts are pivotally engaged with levers 49. There are two bolts for each wing section and one lever for each bolt. The levers to each side are engaged with respective links 50 which are pivotally engaged with links 51 by means of pins 52 extending through arcuate slots 53 provided in a plate 54 on which the levers 55 are fulcrumed.

These slots 53 diverge forwardly from each other. A lever 55 is rockably mounted intermediate its ends in the bracket structure 56 extending downwardly from the floor 5 and rearwardly under and across an opening 57 provided in said floor. This lever is pivotally engaged at its lower end with a member 58 rising from the link 51 and attached thereto and having its upper end offset forwardly.

Obviously by rocking the lever 55 the bolts 48 may be moved inwardly to unlock the wing section 11 and by swinging the lever in the other direction the bolt 48 may be moved outwardly to lock the wing structure 11 in relation to the fuselage when said wing structures are at their normal angle of incidence.

A beveled gear 60 is fixed to the shaft 34 and meshes with a beveled pinion 61 fixed on the lower end of a shaft 62 journaled through the bottom 5. The shaft 62 is formed in two sections hingedly connected together as at 63.

A collar 64 is slidable on the shaft 62 so that when disposed in the full line position shown in Figures 6 and 7 the sections of the shaft 62 are held in alinement but by moving the collar upwardly to the dotted line position shown in Figure 6 the upper section of the shaft 62 may be swung downwardly out of the way. The end of the upper section of the shaft 62 has an operating wheel 65 thereon.

It will thus be seen that by rotating the wheel 65 to the right that is in a clockwise direction, referring to Figure 3, the shaft 62 will rotate the pinion 61 in a similar direction and cause the rocking of the shaft 34 in a clockwise direction referring to Figure 1, thereby causing the pinions 33 to rotate the gears 28 in a counter clockwise direction, referring to Figure 1, so as to tilt the wings forwardly to enable the aeroplane to come out of a tail spin more readily than is possible with the mere manipulation of the usual control.

Obviously by turning the wheel in the opposite direction that is counter-clockwise in the direction of the arrows at the bottom of Figure 1 so as to enable the plane to come out of a nose dive more readily than is possible by the mere manipulation of the usual control.

Attention is now directed particularly to Figure 8 in conjunction with Figure 2 wherein it will be seen that a plate 70 is mounted on the right hand wall 7 in the upper portion of the cock pit.

The plate 70 has two incandescent bulbs 71 connected with a battery 72 or any other suitable source of current. Contacts 73 are provided one for each bulb 71. A switch arm 74 is in circuit with the battery 72 and is mounted by means of an arm 75 projecting inwardly from the right hand gear 28 through slots 76 in the adjacent plates 15 and wall 7. It will thus be seen that when the wings tilt in one direction one light 73 will be lit and when the wings tilt in the other direction the other light will be lit. Lights, if desired may be colored and function as signals to indicate to the aviator which way the wings have been tilted.

The left hand plate 15 and wall 7 are provided with registering arcuate slots 77 through which project an arm 78 having an upwardly disposed extension 79 as clearly shown in Figure 9 and this extension 79 is engageable in the forked end of a rockable switch arm 80 mounted on a plate 81 on the adjacent side wall 7 for closing over contact 82 for causing the lighting of bulb 83 to illuminate the interior of the cock pit whenever the wings are tilted.

From the above detailed description it will be seen that by releasing bolts 20 and 48 the wings may be tilted forwardly or rearwardly by the manipulation of the control shaft 62 as previously indicated.

Normally the bolts are in their locked position and the upper section of the control shaft 62 is tilted forwardly as indicated in dotted lines in Figure 3. Should the aeroplane get into either a nose dive or tail spin, the operator may quickly release the bolt by manipulating the levers 25 and 55 and righting the upper section of the control shaft 62 at which time the collar 64 will gravitate to hold the sections of the shaft in alinement and then by operating the shaft the aeroplane may be brought out of the nose dive or tail spin with considerable facility.

In actual practice I contemplate leaving the bolts 20 unlocked at all times they being provided more for an emergency requisite in rigidly securing the wings whenever they should become necessary.

It is preferable to provide a drum 90 on the shaft 34 and to train thereabout a brake band 91 anchoring one end of the brake band to the plate 54 and anchoring the other end to an intermediate portion of a foot pedal 94 which is rockable on a bracket 95 rising from the plate 54 and extends through an opening in the floor 5 so that the brake band may be tightened about the drum when the lock and bolts are released to prevent the air current from tilting the wings thus placing the tilting action wholly under the control of the aviator.

It is thought that the construction, operation, utility and advantages of the invention will now be quite apparent to those skilled in this art without a more detailed description thereof. The present embodiment of the invention has been disclosed in detail merely for the purpose of exemplification since in actual practice it attains the features of advantage enumerated as desirable in the statement of the invention and the above description. It will be apparent that the changes in the details of construction, and in the combination and arrangement of parts may be resorted to without departing from the spirit or scope of the invention as hereinafter claimed or sacrificing any of its advantages.

Having thus described my invention, what I claim as new is:

1. In an aeroplane, a fuselage, an upper wing structure, a pair of arcuate bars having their ends fixed to the under surface of the wing structure and extending longitudinally of the fuselage, means for slidably receiving the arcuate bars, said means being attached to the fuselage, a pair of gears rotatably mounted on the fuselage, and links connected to the gears and with the wing structure, means for rocking the gears to cause the tilting of the wing structure, said rocking means comprising a shaft journaled through the fuselage, pinions on the outer ends of the shaft meshing with the gears, and means for rocking the shaft, a pair of lower wings, a second shaft connecting the lower wings and journaled through the fuselage, and links connected with the lower wings and said first mentioned gears.

2. In an aeroplane, a fuselage, an upper wing structure, a pair of arcuate bars having their ends fixed to the under surface of the wing structure and extending longitudinally of the fuselage, means for slidably receiving the arcuate bars, said means being attached to the fuselage, a pair of gears rotatably mounted on the fuselage, and links connected to the gears and with the wing structure, means for rocking the gears to cause the tilting of the wing structure, said rocking means comprising a shaft journaled through the fuselage, pinions on the outer ends of the shaft meshing with the gears, and means for rocking the shaft, a pair of lower wings, a second shaft connecting the lower wings and journaled through the fuselage, and links connected with the lower wings and said first mentioned gears, plates attached to the lower wings and having openings, bolts slidable through the fuselage to engage in the opening to lock the lower wings against tilting, and means interiorly of the fuselage for operating said bolts.

3. In an aeroplane, a fuselage, an upper wing structure, a pair of arcuate bars having their ends fixed to the under surface of the wing structure and extending longitudinally of the fuselage, means for slidably receiving the arcuate bars, said means being attached to the fuselage, a pair of gears rotatably mounted on the fuselage, and links connected to the gears and with the wing structure, means for rocking the gears to cause the tilting of the wing structure, said rocking means comprising a shaft journaled through the fuselage, pinions on the outer ends of the shaft meshing with the gears, and means for rocking the shaft, a pair of lower wings, a second shaft connecting the lower wings and journaled through the fuselage, and links connected with the lower wings and said first mentioned gears, said arcuate bars having openings, bolts slidable through the fuselage to engage in the openings of the arcuate bars, and means interiorly of the fuselage for operating the said bolts.

4. In an aeroplane, a fuselage, an upper and lower wing structure, a pair of arcuate bars having their ends fixed to the under surface of the upper wing structure extending longitudinally of the fuselage and having an opening in each bar, means attached to the fuselage for slidably receiving the arcuate bars, a pair of gears rotatably mounted on the fuselage, links connecting both wing structures to the gears, means for moving the gears to cause the tilting of the wing structures, said last-mentioned means comprising a shaft journalled through the fuselage, pinions on the outer ends of the shaft meshing with the gears, means for rocking the shaft, a second shaft extending through the fuselage, the lower wing structure being rockable on the free ends of said second shaft, plates mounted on the lower wing structure at the opposite sides of the fuselage and each plate having an opening therein, bolts slidable through the fuselage to engage with the openings in the arcuate bars and plates to lock the upper and lower wing structures against tilting, means interiorly of the fuselage for operating said bolts, and signalling means in the fuselage operatively connected with the first-mentioned gear to indicate in which direction the wings have been tilted.

5. In an aeroplane, a fuselage, an upper and lower wing structure, a pair of arcuate bars having their ends fixed to the under surface of the upper wing structure extending longitudinally of the fuselage and having an opening in each bar, means attached to the fuselage for slidably receiving the arcuate bars, a pair of gears rotatably mounted on the fuselage, links connecting both wing structures to the gears, means for moving the gears to cause the tilting of the wing structures, said last mentioned means comprising a shaft journalled thru the fuselage, pinions on the outer ends of the shaft meshing with the gears, means for rocking the shaft, a second shaft extending through the fuselage, the lower wing structure being rockable on the free ends of said second shaft, plates mounted on the lower wing structure at the opposite sides of the fuselage and each plate having an opening therein, bolts slidable through the fuselage to engage with the openings in the arcuate bars and plates to lock the upper and lower wing structures against tilting, means interiorly of the fuselage for operating said bolts, illuminating means in the fuselage, and means operatively connecting the illuminating means with the first-mentioned gear to cause the energization of the illuminating means whenever the wings are tilted in either direction.

6. In an aeroplane, a fuselage, an upper and lower wing structure, a pair of arcuate bars having their ends fixed to the under surface of the upper wing structure extending longitudinally of the fuselage and having an opening in each bar, means attached to the fuselage for slidably receiving the arcuate bars, a pair of gears rotatably mounted on the fuselage, links connecting both wing structures to the gears, means for moving the gears to cause the tilting of the wing structures, said last-mentioned means comprising a shaft journalled through the fuselage, pinions on the outer ends of the shaft meshing with the gears, means for rocking the shaft, a second shaft extending through the fuselage, the lower wing structure being rockable on the free ends of said second shaft, plates mounted on the lower wing structure at the opposite sides of the fuselage and each plate having an opening therein, bolts slidable through the fuselage to engage with the openings in the arcuate bars and plates to lock the upper and lower wing structures against tilting, means interior of the fuselage for operating said bolts, and a foot controlled brake engageable with said first-mentioned shaft for holding both wing structures when the locking bolts are released.

7. In an aeroplane, a fuselage, an upper and lower wing structure, a pair of arcuate bars having their ends fixed to the under surface of the upper wing structure extending longitudinally of the fuselage and having an opening in each bar, means attached to the fuselage for slidably receiving the arcuate bars, a pair of gears rotatably mounted on the fuselage, links connecting both wing structures to the gears, means for moving the gears to cause the tilting of the wing structures, said last-mentioned means comprising a shaft journalled through the fuselage, pinions on the outer ends of the shaft meshing with the gears, means for rocking the shaft, a second shaft extending through the fuselage, the lower wing structure being rockable on the free ends of said second shaft, plates mounted on the lower wing structure at the opposite sides of the fuselage and each plate having an opening therein, bolts slidable through the fuselage to engage with the openings in the arcuate bars and plates to lock the upper and lower wing structures against tilting, means interior of the fuselage for operating said bolts, a foot controlled brake engageable with said first-mentioned shank for holding both wing structures when the locking bolts are released, and means in the fuselage operatively connected with the first-mentioned gear to indicate in which direction the wings have been tilted.

8. In an aeroplane, a fuselage, an upper and lower wing structure, a pair of arcuate bars having their ends fixed to the under surface of the upper wing structure extending longitudinally of the fuselage and having an opening in each bar, means attached to the fuselage for slidably receiving the arcuate bars, a pair of gears rotatably mounted on the fuselage, links connecting both wing structures to the gears, means for moving the gears to cause the tilting of the wing structures, said last-mentioned means comprising a shaft journaled through the fuselage, pinions on the outer ends of the shaft meshing with the gears, means for rocking the shaft, a second shaft extending through the fuselage, the lower wing structure being rockable on the free ends of said second shaft, plates mounted on the lower wing structure at the opposite sides of the fuselage and each plate having an opening therein, bolts slidable through the fuselage to engage with the openings in the arcuate bars and plates to lock the upper and lower wing structures against tilting, means interior of the fuselage for operating said bolts, a foot controlled brake engageable with said first-mentioned shank for holding both wing structures when the locking bolts are released, means in the fuselage operatively connected with the first-mentioned gear to indicate in which direction the wings have been tilted, and illuminating means in the fuselage, and means operatively connecting the illuminating means with the first mentioned gear to cause the energization of the illuminating means whenever the wings are tilted in either direction.

In testimony whereof I affix my signature.

GEORGE W. GARDNER.